(12) United States Patent
Mahieu et al.

(10) Patent No.: US 9,944,553 B2
(45) Date of Patent: Apr. 17, 2018

(54) SOLAR PROTECTION GLAZING

(71) Applicant: AGC GLASS EUROPE, Louvain-la-Neuve (BE)

(72) Inventors: Stijn Mahieu, Lovendegem (BE); Gaetan Di Stefano, Ophain-Bois-Seigneur-Isaak (BE); Marc Hauptmann, Kessel-Lo (BE); Jacques Dumont, Bioul (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/901,193

(22) PCT Filed: Jun. 27, 2014

(86) PCT No.: PCT/EP2014/063634
§ 371 (c)(1),
(2) Date: Dec. 28, 2015

(87) PCT Pub. No.: WO2014/207171
PCT Pub. Date: Dec. 31, 2014

(65) Prior Publication Data
US 2016/0145151 A1 May 26, 2016

(30) Foreign Application Priority Data
Jun. 27, 2013 (BE) .................. 2013/0453

(51) Int. Cl.
B32B 15/04 (2006.01)
B32B 17/06 (2006.01)
C03C 17/36 (2006.01)

(52) U.S. Cl.
CPC ........ *C03C 17/3681* (2013.01); *C03C 17/366* (2013.01); *C03C 17/3618* (2013.01); *C03C 17/3626* (2013.01); *C03C 17/3649* (2013.01)

(58) Field of Classification Search
USPC ....... 428/426, 428, 432, 433, 434, 688, 689, 428/697, 698, 699, 701, 702
See application file for complete search history.

(56) References Cited

U.S. PATENT DOCUMENTS

| | | | | |
|---|---|---|---|---|
| 5,837,108 A * | 11/1998 | Lingle | ..................... | C03C 17/36 204/192.1 |
| 6,524,714 B1 * | 2/2003 | Neuman | ............. | C03C 17/3435 427/165 |
| 2002/0192473 A1 * | 12/2002 | Gentilhomme | ..... | C03C 17/3435 428/432 |
| 2004/0166328 A1 * | 8/2004 | Stachowiak | ...... | B32B 17/10174 428/428 |
| 2004/0197574 A1 * | 10/2004 | Stachowiak | ........ | C03C 17/3435 428/432 |
| 2004/0224167 A1 * | 11/2004 | Stachowiak | ...... | B32B 17/10174 428/432 |
| 2005/0123772 A1 * | 6/2005 | Coustet | ................... | C03C 17/36 428/432 |
| 2006/0046089 A1 * | 3/2006 | O'Shaughnessy | ...... | C03C 17/36 428/630 |
| 2006/0159933 A1 * | 7/2006 | Disteldorf | .......... | C03C 17/3435 428/432 |
| 2007/0218311 A1 | 9/2007 | O'Shaughnessy et al. | | |
| 2011/0146172 A1 * | 6/2011 | Mauvernay | ......... | C03C 17/3435 52/235 |
| 2011/0170176 A1 | 7/2011 | O'Shaughnessy et al. | | |
| 2011/0261442 A1 * | 10/2011 | Knoll | ...................... | C03C 17/36 359/360 |
| 2011/0262726 A1 * | 10/2011 | Knoll | ...................... | C03C 17/36 428/213 |
| 2013/0057951 A1 * | 3/2013 | Hevesi | .................... | C03C 17/36 359/359 |
| 2013/0059137 A1 * | 3/2013 | Hevesi | .................... | C03C 17/36 428/213 |
| 2014/0347722 A1 * | 11/2014 | Hevesi | ................ | C03C 17/3613 359/359 |
| 2016/0002101 A1 * | 1/2016 | Mahieu | ............... | C03C 17/3618 359/359 |

FOREIGN PATENT DOCUMENTS

FR 2 799 005 A1 3/2001
WO 2012/095380 A1 7/2012

OTHER PUBLICATIONS refractiveindex.info (http://refractiveindex.info).*
International Search Report dated Aug. 7, 2014 in PCT/EP2014/063634 filed Jun. 27, 2014.

* cited by examiner

*Primary Examiner* — Lauren R Colgan
(74) *Attorney, Agent, or Firm* — Oblon, McClelland, Maier & Neustadt, L.L.P.

(57) ABSTRACT

The invention relates to a solar protection glazing comprising, on at least one of the faces of a glass substrate, a multi-layer stack comprising at least one layer absorbing solar radiation of at least 3 nm and dielectric coatings surrounding said solar radiation absorbing layer. According to the invention, the light reflection of the glass substrate coated with the multi-layer stack, measured on the substrate side, is at least 20% and is at least two times the light reflection of the glass substrate coated with the multi-layer stack measured on the stack side, and the reflection color on the substrate side has a colorimetric coordinate value a* of less than 2 and a colorimetric coordinate value b* of less than 5. The invention is particularly useful as an automobile glazing, in particular on the roof thereof, as a building glazing or as a household oven.

23 Claims, No Drawings

SOLAR PROTECTION GLAZING

1. FIELD OF THE INVENTION

The field of the invention is that of solar-control glazing units consisting of a glazing substrate bearing a multilayer stack, at least one thin film of which provides said solar-control properties. With this functional layer are associated dielectric layers that especially play the role of adjusting the reflective, transmissive and colour properties of the stack and of protecting these properties from mechanical or chemical degradation.

More precisely, the invention relates to glazing units intended to be fitted in buildings but also in automotive vehicles. Depending on the application, certain required properties may differ.

Solar-control glazing units have multiple functionalities. These functionalities are especially used to prevent heating of the interior of passenger compartments of automotive vehicles, in particular with respect to solar radiation passing through a transparent roof, or in buildings exposed to solar radiation when the latter is sufficiently intense. In certain embodiments, heating may be prevented while maintaining a suitable light transmission.

Especially in the case of architectural glazing units, but also of automotive glazing units, it is more and more frequently a requirement that these glazing units be able to undergo heat treatments without their colour, especially in reflection, changing substantially. The objective is to be able to place glazing units that have been heat treated and other glazing units that have not side-by-side without differences in colour being obvious.

In the rest of the description, optical properties are defined for glazing units having a substrate made of ordinary 4 mm-thick clear float glass. Obviously, the choice of substrate has an influence on these properties. For ordinary clear glass, light transmission for 4 mm of glass, in the absence of layers, is approximately 90% and reflection 8%, as measured under a CIE D65 standardized "daylight" source and within a solid angle of 2°. For their part, energy measurements were carried out according to standard EN 410.

The term "glass" is understood to mean mineral glass. By this is meant a piece of glass that is at least larger than or equal to 0.5 millimeters in thickness and at most smaller than or equal to 20.0 mm in thickness, that is preferably at least larger than or equal to 1.5 mm in thickness and at most smaller than or equal to 10.0 mm in thickness, and that comprises silicon as one of the indispensable constituents of the vitreous material. In certain applications, the thickness may for example be 1.5 or 1.6 mm, or 2 or 2.1 mm. In other applications, it will for example be about 4 or 6 mm. Clear, extra-clear or surface- or bulk-tinted soda-lime-silica glasses are preferred.

The presence of a multilayer stack may cause problems with hue. Most often, the market requires glazing units to have, both in transmission and in reflection, a hue that is as neutral as possible and therefore grey to the eye. Slightly green or bluish hues are also possible. However, clearly more pronounced colours, blue or green for example, are also sometimes required to meet particular aesthetic criteria. The multilayer stacks, and in particular the natures, indices and thicknesses of the dielectric layers flanking the functional layers are especially chosen in order to adjust these hues.

In theory, automotive glazing units may be multiple glazing units, in particular in order to improve their thermal insulation properties. In fact such embodiments are exceptional. The vast majority of these glazing units are single glazing units that are either monolithic or laminated. The multilayer stack may be located on a face that is not sheltered from mechanical stresses or chemical attack. The stacks in question must therefore have a very good resistance to these possible aggressions.

In practice, to limit the risk of degradation, multilayer stacks are normally placed on that face of the glazing unit which is turned towards the passenger compartment. However, even in this position they must have a very good mechanical resistance.

The systems of layers according to the invention must also lend themselves to shaping of the glazing units. Those used in vehicles are in particular subjected to heat treatments during forming, especially in operations for bending the glass sheets or even in the tempering operation that is especially intended to improve their mechanical properties. The layers used according to the invention must withstand these treatments without their properties being degraded. Treatments of this type require temperatures that exceed 600° C. for about ten minutes. Subjected to these temperatures the layers must preserve their qualities and properties.

Commercially, the aesthetic appearance of solar-control glazing units is also highly important. Specifically, the glazing unit is not only required to possess thermal solar-control properties, but also to contribute to the aesthetic quality of the assembly to which it belongs. These aesthetic criteria may sometimes lead to situations that conflict somewhat with the obtainment of the sought-after best thermal properties.

2. PRIOR-ART SOLUTIONS

The prior art discloses anti-solar glazing units comprising a layer for absorbing solar radiation, which layer is flanked by dielectric layers.

Patent application EP 779 255 A1 describes a substrate made of glass coated with a layer for absorbing solar radiation made of NiCr, which layer is flanked by $Si_3N_4$ dielectric layers that can withstand a heat treatment at a high temperature.

U.S. Pat. No. 6,852,419 B2 describes an anti-solar glazing unit comprising a stack formed from a layer for absorbing solar radiation made of $NbCrN_x$, which layer is flanked by $Si_3N_4$ dielectric coatings. This stack is capable of withstanding a heat treatment at a high temperature.

Patent application FR 2 869 606 A1 describes an anti-solar glazing unit comprising a stack formed from a layer for absorbing solar radiation made out of Nb, which layer is flanked by $Si_3N_4$ dielectric coatings. The stack may also withstand a heat treatment at a high temperature.

These prior disclosures meet at least some of the requirements of the applications envisaged for glazing units according to the invention, in particular as regards thermal solar-control properties. Nevertheless, their aesthetic properties must be improved further if certain commercial requirements are to be satisfied.

3. OBJECTIVES OF THE INVENTION

The objective of the invention is in particular to overcome this drawback of the prior art.

More precisely, one objective of the invention is to provide a glazing unit equipped with a multilayer stack having anti-solar properties that in addition also lends a favourable aesthetic appearance to the assembly in which it is installed, and which is of simple and inexpensive manufacture, in particular with a minimum of layers.

One objective of the invention, in at least one of its embodiments, is also to provide a glazing unit equipped with a multilayer stack having anti-solar and aesthetic properties that is able to withstand a high-temperature heat treatment, such as a tempering and/or bending treatment, preferably without substantial modification of its colour, in particular in reflection on the substrate side, such that a glazing unit that has not been heat treated may be juxtaposed with its heat-treated version without it being possible for an observer to detect a significant difference in their overall aesthetic appearance.

Another objective of the invention, in at least one of its embodiments, is to provide a glazing unit equipped with a multilayer stack having a good stability from the thermal, chemical and mechanical point of view.

Another objective of the invention, in at least one of its embodiments, is to provide a glazing unit the multilayer stack of which may be placed externally without it necessarily being required to use another substrate to protect said stack from the external environment.

4. SUMMARY OF THE INVENTION

The invention relates to a transparent solar-control glazing unit comprising on at least one of the faces of a glazing substrate a transparent multilayer stack comprising a layer for absorbing solar radiation of at least 3 nm in geometric thickness and first and second dielectric coatings flanking said layer for absorbing solar radiation, characterized in that the light reflection of the glazing substrate coated with the multilayer stack as measured on the substrate side is at least 20% and is at least double the light reflection of the glazing substrate coated with the multilayer stack as measured on the stack side, and in that the colour in reflection on the substrate side has a (CIE L*a*b*) a* colour coordinate value lower than 2 and a b* colour coordinate value lower than 5.

This novel feature with regard to light reflection runs counter to common practice according to which the light reflections do not differ greatly from each other.

It has been discovered that this combined feature is advantageous in that surprisingly it produces a notable and pleasing aesthetic effect, while preserving a satisfactory visibility from the interior of the space closed by the glazing unit to the exterior and while avoiding an unpleasant mirror effect when viewed from the interior.

The layer for absorbing solar radiation, i.e. the functional layer of the stack, has a geometric thickness of at least 3 nm, preferably of at least 5 nm and advantageously at least 10 nm. This thickness plays a key role in the light transmission and the solar factor of the glazing unit. The thickness must be large enough, at least 3 nm, to obtain a significant effect. Adjustment of the thickness then allows properties to be adjusted to the desired values.

The expression "layer for absorbing solar radiation" is understood in the present invention to mean a layer formed from a metal, or a metal alloy, or a metal nitride, or a metal nitride alloy, having an average extinction coefficient, between 380 nm and 750 nm, higher than 0.8, preferably higher than 1.2, and advantageously higher than 1.4.

The dielectric coatings flanking the layer for absorbing solar radiation preferably comprise at least one layer made of a dielectric material based on a compound selected from silicon oxide, aluminium oxide, silicon nitride, aluminium nitride, mixed aluminium/silicon nitrides, silicon oxynitride and aluminium oxynitride.

The one or more layers forming the coating made of dielectric material may also be layers doped with at least one other element, containing up to a maximum of about 10% by weight of this other element, said doped layers having dielectric properties that in practice are not different from those of layers consisting of said dielectric material. Thus, for example when the layer is made of silicon nitride, said layer may contain up to 10% by weight aluminium (an example being layers deposited by cathode sputtering from a silicon target containing up to 10% by weight aluminium). The dielectric coatings may furthermore be made up of a plurality of individual layers comprising or essentially consisting of these same materials. The dielectric layers may also be deposited by the well-known technique plasma-enhanced chemical vapour deposition (PECVD).

The layer for absorbing solar radiation, which is the functional layer, is flanked by dielectric coatings. This does not mean that these dielectric coatings must necessarily make direct contact with the functional layer as thin intermediate films may be inserted in between for various reasons, but the dielectric coatings must be located in the immediate vicinity of the functional layer. Each of the dielectric coatings may be a monolayer, but each of the dielectric coatings may also comprise a plurality of layers of different materials. However, each of said dielectric coatings will always preferably contain at least 10 nm of one dielectric material chosen from silicon oxide, silicon oxynitride or silicon nitride and aluminium oxide, aluminium oxynitride or aluminium nitride. The other dielectric materials may be materials based on oxides of Zn, Sn, Ti, Zr and Nb, or other dielectric materials well known in the field, and in particular zinc stannate.

Preferably, the light reflection of the glazing substrate coated with the multilayer stack as measured on the substrate side is at least 2.5 times, advantageously at least 3 times, and preferably at least 3.5 times, or even 4 times, higher than the light reflection of the glazing substrate coated with the multilayer stack as measured on the stack side. Preferably, the light reflection measured on the substrate side is higher by at least 14%, by at least 16%, preferably by at least 20% and advantageously by at least 25%, than the light reflection measured on the stack side.

Thus it is possible to obtain a very high external light reflection creating a very marked aesthetic effect while preserving a good visibility through the glazing unit as observed from the interior of the space closed by the glazing unit.

According to one preferred embodiment of the invention, the light reflection measured on the substrate side is at least 27%, preferably at least 30% and advantageously at least 35%.

To obtain a high light reflection on the substrate side and a high difference between the reflections on the two sides of the coated substrate, various embodiments are possible. One effective means in the context of the transparent glazing units that are the subject of the invention is to favourably influence interference effects between the layers. Here again, various embodiments may be envisaged. However, interference greatly influences the colours obtained in reflection and transmission. Preferably, the virtual optical thickness L of the first dielectric coating, which coating is placed between the substrate and the layer for absorbing solar radiation, has a value lower than or equal to 25 nm or even lower than or equal to 20 nm, advantageously lower than or equal to 17 nm, and preferably lower than or equal to 15 nm. This feature favours the obtainment of a high light reflection on the substrate side while making it possible to preserve the required colour. Preferably, the virtual optical thickness L of the first dielectric coating is comprised between 5 and 20 nm, advantageously between 10 and 20, and preferably between 12 and 16 nm. This allows a good compromise to be obtained between a high difference in reflection between the two faces, a relatively neutral colour on the substrate side and a high resistance to heat treatment.

The virtual optical thickness L of a dielectric coating is defined, in the context of the present invention, as being the sum of the (physical) geometric thicknesses, in nm, of each of the dielectric materials forming the dielectric coating multiplied by the refractive index n at 550 nm of each of the materials minus the refractive index of the gas of the surrounding atmosphere. For a coating formed of a plurality of different dielectric materials, the value L is obtained by summing the results of multiplication of the geometric thickness (e) in nm of each of the materials by the value obtained by subtracting the value of the refractive index at 550 nm of the atmosphere, in general air, i.e. the value 1, from the refractive index n at 550 nm of the corresponding material [$L=e \times (n_{D\ 550} - n_{air\ 550})$, where $n_{D\ 550}$=refractive index of the material at 550 nm].

Preferably, the second dielectric coating, which is placed beyond the layer for absorbing solar radiation relative to the substrate, has a total virtual thickness L comprised between 35 and 85 nm, advantageously between 40 and 70 nm, and preferably between 45 and 65 nm, and ideally between 50 and 60 nm, and the average refractive index n of the coating is higher than 1.5. This feature makes it easy to obtain at the same time both a high external reflection and a low internal reflection, while retaining an acceptable and aesthetically pleasing external colour in reflection.

Advantageously, the virtual optical thickness L of the first dielectric coating is comprised between 10 and 20 nm, and the total virtual thickness L of the second dielectric coating is comprised between 45 and 65 nm, preferably between 50 and 60 nm. Thus, optimal conditions are obtained for achieving a high reflection on the substrate side, a low reflection on the layer side and a relatively neutral colour in reflection on the substrate side.

Preferably, the virtual thickness L of the first dielectric coating, which is placed between the substrate and the layer for absorbing solar radiation, is at least one and a half times larger or smaller than the virtual thickness L of the last dielectric coating of the multilayer stack placed above the infrared-absorbing layer relative to the substrate. This feature makes it easier to adapt the interference effects. Preferably, the virtual thickness L of the first dielectric coating, which is placed between the substrate and the layer for absorbing solar radiation, is at least one and a half times smaller, advantageously two times, and preferably three times, smaller than the virtual thickness L of the last dielectric coating of the multilayer stack placed above the infrared-absorbing layer relative to the substrate.

As already indicated above, one of the dielectric materials preferred for forming said dielectric coatings, and in particular the second coating placed above the functional layer, is silicon nitride, which has a refractive index comprised between 1.9 and 2.05. However, as also explained above, the dielectric coating may include layers of dielectric materials other than silicon nitride. Preferably, the coating made of dielectric material placed above the layer for absorbing solar radiation comprises a material having a high refractive index, higher than 2 and preferably higher than 2.1. In the context of the present invention, this high-refractive-index dielectric is preferably a material that is able to withstand heat treatment without substantial structural modification. A specific example of such a material is doped or mixed titanium oxide, for example doped or mixed with zirconium or niobium, and especially a mix of titanium oxide and zirconium oxide each in proportions of 40 to 60%. Another example of such a material is zirconium oxide. Preferably, this high-index material is placed between the layer for absorbing solar radiation and the outermost dielectric layer of the stack.

The layer for absorbing solar radiation may be a nitride, such as TiN, CrN, WN, NbN, TaN, ZrN or NiCrN, or a mixture of these nitrides. These nitrides may also be partially oxidised. Preferably, the layer for absorbing solar radiation is an essentially metal layer, such as a layer made of NiCr, W, Nb, Zr, Ta, stainless steel, or alloys based on Ni and/or Cr.

Preferably, the layer for absorbing solar radiation is a metallic layer based on a metal having an extinction coefficient k between 2 and 4.5 in the range of the visible spectrum ranging from 380 nm to 750 nm.

Preferably, the layer for absorbing solar radiation is a layer of an alloy based on NiCr and W, or an alloy based on Cr and Zr, an alloy based on W and Zr or Cr, or an alloy based on W and Ta. These alloys have proved to be very advantageous for forming layers for absorbing solar radiation that easily withstand high-temperature heat treatment without significant degradation of their properties. These alloys may also include an additional metal selected from Ti, Nb, Ta, Ni and Sn.

According to certain preferred embodiments of the invention, the layer for absorbing solar radiation is a layer of an NiCrW alloy flanked by a first dielectric coating formed essentially of silicon nitride of a geometric thickness comprised between 10 and 20 nm, and a second dielectric coating formed essentially of silicon nitride of a geometric thickness comprised between 50 and 65 nm. According to other preferred embodiments, the layer for absorbing solar radiation is a layer of an NiCr alloy flanked by a first dielectric coating formed essentially of silicon nitride of a geometric thickness comprised between 10 and 20 nm, and a second dielectric coating formed essentially of silicon nitride of a geometric thickness comprised between 55 and 60 nm. According to yet other preferred embodiments, the layer for absorbing solar radiation is a layer of a CrZr alloy flanked by a first dielectric coating formed essentially of silicon nitride of a geometric thickness comprised between 10 and 20 nm, and a second dielectric coating formed essentially of silicon nitride of a geometric thickness comprised between 60 and 66 nm.

Preferably, the layer for absorbing solar radiation has a geometric thickness comprised between 3 and 40 nm, even between 3 and 30 nm, and preferably comprised between 5 and 25 nm. Preferably, the layer for absorbing solar radiation has a geometric thickness preferably comprised between 10 and 25 nm, and advantageously comprised between 12 and 22 nm. Such a layer for absorbing solar radiation is suitable for forming the functional layer of the multilayer stack, i.e. the layer essential to obtainment of the solar-control properties. Thus, an extremely simple and a very resistant multilayer stack may easily be obtained.

Preferably, the two dielectric coatings flanking the layer for absorbing solar radiation are based on silicon nitride or aluminium nitride. This ensures that the metal layer for absorbing solar radiation is very well protected during high-temperature heat treatments.

Other additional layers may be added, either directly to the substrate, or as an external protective layer, or in the stack of the multilayer stack, in order to provide the basic multilayer stack with additional properties and/or protection, such as for example additional external protection from mechanical or chemical aggressions, for example formed by a mixture of titanium oxide and zirconium oxide, or to provide a barrier to alkali-metals coming from the substrate, or different optical properties, or to improve the electrical properties of the metal layers, or to increase the deposition rate, or indeed provide any other additional functions. The additional layers chosen must preferably however not compromise the ability of the multilayer stack to undergo high-temperature heat treatments. In particular, care will advantageously be taken to ensure that these additional layers do not undergo substantial modifications, and especially structural modifications, when subjected to a heat treatment in order to prevent them from modifying the optical properties of the multilayer stack during such heat treatments.

Heat treatments, especially bending/tempering type heat treatments, may also induce more or less noticeable modifications of optical properties and especially colours. Preferably, these changes must be minimised such that independently of whether they have undergone a heat treatment or not the glazing units have an appearance that remains practically unchanged.

Conventionally, changes are measured using CIE Lab system coordinates. Changes are expressed by the expression denoted $\Delta E^*$, which expression corresponds to the formula:

$$\Delta E^* = (\Delta L^{*2} + \Delta a^{*2} + \Delta b^{*2})^{1/2}$$

where $\Delta L^*$ represents the difference between the $L^*$ colour coordinates of the glazing unit before and after heat treatment;

$\Delta a^*$ represents the difference between the $a^*$ colour coordinates of the glazing unit before and after heat treatment; and $\Delta b^*$ represents the difference between the $b^*$ colour coordinates of the glazing unit before and after heat treatment.

More particularly, and preferably, the glazing unit according to the invention exhibits a colour change in reflection on the substrate-facing side, $\Delta E^*_{rg}$:

$$\Delta E^*_{rg} = (\Delta L^*_{rg}{}^2 + \Delta a^*_{rg}{}^2 + \Delta b^*_{rg}{}^2)^{1/2}$$

smaller than 8, preferably smaller than 5, advantageously smaller than 3, and even preferably smaller than 2, when said glazing unit is subjected to a temperature of at least 630° C. and at most 670° C. for 7 minutes.

The invention is particularly useful for obtaining a very good stability of the colour in reflection on the substrate side during a heat treatment at a high tempering and/or bending temperature. The colour in reflection on the substrate side is, in many applications, the colour most conspicuous to an observer, because it is this face that attracts his/her attention under the conditions of use of the glazing unit. The slightest difference in colour is therefore easily noticeable.

Additionally, the glazing unit according to the invention also preferably exhibits a colour change in transmission, $\Delta E^*_{tr}$:

$$\Delta E^*_{tr} = (\Delta L^*_{tr}{}^2 + \Delta a^*_{tr}{}^2 + \Delta b^*_{tr}{}^2)^{1/2}$$

smaller than 8, preferably smaller than 5, more preferably smaller than 3, when said glazing unit is subjected to a temperature of at least 630° C. and at most 670° C. for 7 minutes.

The glazing unit according to the invention exhibits, in addition or not to the two preceding properties, a colour change in reflection on the layer-facing side, $\Delta E^*_{rc}$, such that:

$$\Delta E^*_{rc} = (\Delta L^*_{rc}{}^2 + \Delta a^*_{rc}{}^2 + \Delta b^*_{rc}{}^2)^{1/2}$$

smaller than 8, preferably smaller than 5, when said glazing unit is subjected to a temperature of at least 630° C. and at most 670° C. for 7 minutes.

According to one particular embodiment, the glazing unit according to the invention is such that the thickness of the layer for absorbing solar radiation is chosen so that the light transmission of a substrate made of 4 mm-thick clear glass is at least equal to 2% and at most equal to 75%. In the case of use in an automotive vehicle roof, the light transmission will preferably be between 2 and 10%, and advantageously between 6 and 8%. In the case of an architectural application, the light transmission will preferably be between 10 and 70%, advantageously between 10% and 60%, favourably between 10 and 50%, and preferably between 20 and 40%. Specifically, the layer for absorbing solar radiation controls light and energy transmission, so that the thicker this layer is the more it absorbs.

Glazing units according to the invention may be used in various applications as their properties can be adapted by making adjustments to the layers and especially their thicknesses.

Glazing units according to the invention may form part of double glazing units and, in this case, the multilayer stack may be placed in the space between the two glass sheets, thereby limiting the risk of degradation, especially mechanical degradation. Nevertheless, one of the significant features of the multilayer stacks of glazing units according to the invention is their mechanical and chemical resistance. This resistance is such that they may be used with the multilayer stack exposed without other protection. In the latter case, the glazing unit may just as well be made up of a single glass sheet, the multilayer stacks being applied to one face of this sheet. It may also be a question of a laminated glazing unit comprising two or more glass sheets, the glass sheets conventionally being held together by means of intermediate thermoplastic sheets in this field.

When applied to a single glazing unit, the multilayer stack is not protected from the environment. Even in the case of a laminated glazing unit, the layers may be located on an external face in order to play their role in controlling energy transmission by regulating the emissivity of the surface.

The glazing unit according to the invention may therefore be used as a glazed element in an automotive vehicle: roof, side window, rear windscreen (the multilayer stack preferably being located on the face exposed to the passenger compartment); and as an architectural glazing element.

The glazing unit according to the invention may also be used as a glazed element in a household appliance, as an oven door for example, where it may also provide a desired aesthetic effect. It resists well the various chemical and/or mechanical aggressions encountered in this particular type of application.

As already indicated above a number of times, the glazing unit according to the invention may of course also be used as a glazed element in a building. In this particular application, the glazing unit may form a double or triple glazing unit having the multilayer stack placed facing the closed space inside the multiple glazing unit. The glazing unit may also be a laminated glazing unit the multilayer stack of which may make contact with the adhesive thermoplastic material, generally PVB, holding the substrates together.

However, the glazing unit according to the invention is particularly useful when the multilayer stack is exposed to the external environment, independently of whether it is a question of a single glazing unit or a laminated glazing unit, or even optionally a multiple glazing unit.

Of course, the glazing substrate may be made of bulk-tinted glass, such as glass tinted grey, blue or green, in order to absorb more solar radiation, or to form a private space having a low light transmission and thereby prevent the passenger compartment of the vehicle, or an office in a building, from being looked into from outside.

5. DESCRIPTION OF PREFERRED EMBODIMENTS OF THE INVENTION

Example glazing units according to the invention but also comparative examples ("R") are presented in Table I below. The optical properties are given for glazing units having a substrate made of ordinary 4 mm-thick clear float glass. The layers are in order, from left to right, starting from the glass. The approximate geometric thicknesses are expressed in nm.

Table I: Examples of glazing units according to the invention and comparative examples allowing the performance of glazing units according to the invention and of prior-art glazing units to be compared, the coatings being deposited on 4 mm-thick clear glass. The light transmissions (TL) and the light reflections on the layer side (Re) and glass side (Rg) are also indicated (in %) for certain examples.

The layers for absorbing solar radiation and the dielectric layers were applied using a cathode sputtering technique under conventional conditions for this type of technique. As a variant, the dielectric layers could have been applied using the well-known plasma-enhanced chemical vapour disposition (PECVD) technique.

The dielectric layers of silicon nitride were produced from metal targets in an atmosphere consisting of a mixture of argon (30-70%) and nitrogen (70-30%) at a total pressure of 4 mtorr (0.53 Pa). The layers of chromium/zirconium (40% by weight Cr and 60% zirconium in the CrZr alloy), the nickel/chromium layers (80/20 nickel/chromium) and the nickel/chromium (80/20 nickel/chromium)/tungsten (50% by weight NiCr and 50% W in the NiCrW alloy) layers were deposited from metal cathodes in an only argon atmosphere. The dielectric layers of silicon oxide were produced from the outset from a target based on silicon in an atmosphere containing argon and oxygen.

On the samples, the light transmission TL and the light reflection on the substrate side were measured under illuminant D65, 2°. The CIE L*, a*, b* colour coordinates were also measured before and after heat treatment under illuminant D65, 10°. The angle at which the measurements were carried out was 8°.

The samples were subjected to a heat treatment comprising a step in which they were held at 670° C. for 8 min and 30 sec. The ΔE* changes, in transmission and reflection, are also given in Table I. In this table, the notation SiN denotes silicon nitride without representing a chemical formula, it being understood that the products obtained are not necessarily rigorously stoichiometric, but instead are those obtained under the deposition conditions indicated, these products being nearly stoichiometric. The layers made of SiN may contain up to a maximum of about 10% by weight of aluminium originating from the target. The SiN layers have a refractive index n=2.03 at 550 nm. The dielectric coating may furthermore consist of a plurality of individual layers comprising or consisting essentially of these same materials.

The figures between parentheses are the physical thicknesses in manometers of the various layers. The properties (in % for the light transmission and reflection) are given for monolithic glazing units after heat treatment. The acronym "TZO" represents a mixed oxide comprising 50% $TiO_2$ and 50% $ZrO_2$. The TZO layers have a refractive index n=2.3 at 550 nm.

TABLE I

| Ex. | Multilayer stack | TL | Rc | Rg | $\Delta E^*_{Tl}$ | $\Delta E^*_{Rc}$ | $\Delta E^*_{Rg}$ |
|---|---|---|---|---|---|---|---|
| R1 | SiN (20)/NiCrW (8.5)/SiN (35) | 31.6 | 19.3 | 24.6 | 0.7 | 1.9 | 1.7 |
| R2 | SiN (20)/NiCrW (13.7)/SiN (35) | 19.9 | 25.7 | 32.7 | 1.3 | 1.3 | 0.9 |
| R3 | SiN (20)/NiCrW (22)/SiN (35) | 10.19 | 33 | 41.4 | 3 | 2.1 | 0.3 |
| R4 | SiN (87)/NiCrW (13.7)/SiN (30) | 20.67 | 31.9 | 21.6 | 2 | 3 | 0.8 |
| 1 | SiN (13)/CrZr (6.7)/SiN (50.6) | 33.8 | 7.4 | 34.6 | | | |
| 2 | SiN (13)/CrZr (10.3)/SiN (46.7) | 23.5 | 13.8 | 39.9 | | | |
| 3 | SiN (79.2)/CrZr (14)/SiN (50.1) | 22.2 | 15 | 30.9 | | | |
| 4 | SiN (16.4)/CrZr (7.6)/TZO (24.1)/SiN (25) | 31.3 | 8.6 | 39 | | | |
| 5 | SiN (13)/CrZr (11.6)/TZO (21.4)/SiN (25) | 21.6 | 12.7 | 44.7 | | | |
| 6 | SiN (13.4)/CrZr (21.3)/TZO (18.2)/SiN (31.3) | 10.8 | 15.7 | 51.2 | | | |
| 7 | SiN (78)/CrZr (14.7)/TZO (22.5)/SiN (25.1) | 22 | 13.4 | 33 | | | |
| 8 | SiN (15)/NiCrW (9.8)/SiN (50.6) | 32.5 | 6 | 34.6 | 0.6 | 6 | 1 |
| 9 | SiN (15)/NiCrW (15.4)/SiN (48.2) | 21.6 | 11.5 | 40.1 | 0.9 | 5.3 | 0.7 |
| 10 | SiN (15)/NiCrW (24.5)/SiN (48) | 10.5 | 17.5 | 45 | 2.1 | 3.7 | 1.5 |
| 11 | SiN (78.4)/NiCrW (18)/SiN (49.5) | 20.4 | 14.9 | 30.9 | 1-2 | 4.9 | 0.7 |
| 12 | SiN (15)/NiCrW (10.1)/TZO (29.7)/SiN (20) | 32.4 | 6.1 | 39.2 | 1.2 | 3.1 | 0.9 |
| 13 | SiN (15)/NiCrW (16.2)/TZO (27.2)/SiN (20) | 21.1 | 9.2 | 45.1 | 0.9 | 2.6 | 0.9 |
| 14 | SiN (15)/NiCrW (25)/TZO (13.2)/SiN (34.7) | 10.8 | 14.9 | 47.7 | 0.4 | 2.8 | 0.6 |
| 15 | SiN (75.4)/NiCrW (18.9)/TZO (23.7)/SiN (23.6) | 21.3 | 11.9 | 33.5 | 1.4 | 1.4 | 0.3 |

The (CIE L*a*b*) colour coordinates of the comparative examples and certain examples according to the invention are given in Table II below in reflection on the substrate side and in transmission.

TABLE II

| | Glass-side reflection $R_G$ | | | Transmission | | |
|---|---|---|---|---|---|---|
| Ex. | L* | a* | b* | L* | a* | b* |
| R1 | 56.8 | −1.97 | −3.5 | 63.14 | −0.81 | −4.51 |
| R2 | 63.93 | −1.66 | −0.86 | 51.89 | −0.98 | −5.1 |
| R3 | 70.38 | −1.32 | 2.96 | 38.28 | −1.08 | −2.49 |
| R4 | 54.23 | −3.43 | −17.41 | 52.52 | −0.45 | 2.38 |
| 1 | 65.28 | −3.2 | −1.74 | 64.02 | −2.18 | −1.93 |
| 2 | 69.45 | −2.66 | −0.2 | 53.77 | −2.39 | −2 |
| 3 | 62.41 | −3.08 | −12.22 | 52.59 | −2.58 | 7.41 |
| 4 | 68.7 | −3.3 | −2.0 | | | |
| 5 | 72.6 | −2.7 | −1.3 | | | |
| 6 | 75.5 | −1.7 | 6 | | | |
| 7 | 64.6 | −3.1 | −11.9 | | | |

Examples according to the invention had an external reflection that was high as seen from the substrate side, and an internal reflection that was low as seen from the stack side, thereby providing a shine and sparkle delivering a particularly remarkable aesthetic effect while preserving a low internal reflection (absence of mirror effect) and a colour in reflection meeting commercial requirements. It will also be noted that this aesthetic effect is more easily obtained when the thickness of the second dielectric coating is within the preferred range, particularly when the first dielectric coating is thin. Furthermore, Example 3 shows that if a thick first dielectric coating is used while preserving a high ratio between the two dielectric coatings, this aesthetic effect may be obtained with a particularly strong blue colour, as shown by the highly negative value of the b* colour coordinate.

The mechanical and chemical resistance of the glazing units according to the invention was characterised by successful passing of the tests defined in standard EN 1096-2 for what are referred to as class B coatings. Furthermore, the glazing units according to the invention also met the requirements of the following tests:

the neutral salt spray (NSS) test according to standard ISO 9227-2006, preferably for at least ten days;

the environmental chamber test according to standard EN 1036-2008, preferably for at least 10 days;

the Cleveland test according to standard ISO 6270-1: 1998, preferably for at least ten days;

the ($SO_2$) acid resistance test according to standard EN 1096-2;

the automatic web rub test (AWRT) described below: a piston covered with a cloth made of cotton was brought into contact with the layer to be evaluated and oscillated over its surface, the piston bore a weight so as to apply a force of 33 N to a finger having a diameter of 17 mm. The rubbing of the cotton over the coated surface will damage (remove) the layer after a certain number of cycles. The test is used to define the limit before the layer discolours (partial removal of the layer) and scratches appear in the layer. The test was carried out for 10, 50, 100, 250, 500 and 1000 cycles in various separate locations on the sample. The sample was observed under an artificial sky in order to determine whether a discolouration or scratches could be seen on the sample. The AWRT result indicates the number of cycles resulting in no or very little degradation (invisible to the naked eye under a uniform artificial sky at 80 cm distance from the sample); and the dry brush test (DBT) according to standard ASTM D2486-00 (test method "A"), preferably for at least one thousand cycles, these tests being carried out both before and after any heat treatment.

Of course, the invention is not limited to the aforementioned embodiments.

The invention claimed is:

1. A transparent solar-control coated substrate consisting of:
a glazing substrate, and
a transparent multilayer stack on one face of the substrate, the transparent multilayer stack consisting of:
a first dielectric coating in direct contact with the substrate, the first dielectric coating having a maximum total virtual thickness L of 25 nm;
a layer for absorbing solar radiation of at least 3 nm in geometric thickness; and
a second dielectric coating having a total virtual thickness L of 40 nm to 85 nm,
wherein:
the glazing substrate comprises a substrate side and a stack side;
a light reflection of the glazing substrate coated with the transparent multilayer stack as measured on the substrate side is at least 20% and is at least double the light reflection of the glazing substrate coated with the transparent multilayer stack as measured on the stack side;
the color in reflection on the substrate side has an a* color coordinate value lower than 2 and a b* color coordinate value lower than 5,
the layer for absorbing solar radiation is selected from the group consisting of a NiCrW alloy and a ZrCr alloy, and
L is defined as the sum of the (physical) geometric thicknesses, in nm, of each of the dielectric materials forming a dielectric coating multiplied by the refractive index n at 550 nm of each of the materials minus the refractive index of the gas of the surrounding atmosphere.

2. The solar-control glazing unit according to claim 1, wherein the light reflection of the glazing substrate coated with the transparent multilayer stack as measured on the substrate side is at least 2.5 times higher than the light reflection of the glazing substrate coated with the transparent multilayer stack as measured on the stack side.

3. The solar-control glazing unit according to claim 1, wherein the light reflection of the glazing substrate coated with the transparent multilayer stack as measured on the substrate side is higher by at least 14% than the light reflection of the glazing substrate coated with the transparent multilayer stack as measured on the stack side.

4. The solar-control glazing unit according to claim 1, wherein the light reflection of the glazing substrate coated with the transparent multilayer stack as measured on the substrate side is at least 27%.

5. The solar-control glazing unit according to claim 1, wherein:
an average refractive index n of the second dielectric coating at 550 nm is higher than 1.5.

6. The solar-control glazing unit according to claim 1, wherein the second dielectric coating which is placed above the layer for absorbing solar radiation, comprises a dielectric material having a high refractive index at 550 nm of higher than 2.

7. The solar-control glazing unit according to claim 6, wherein the second dielectric coating, which is made of dielectric material and is placed above the layer for absorbing solar radiation, comprises a mixture of titanium oxide and niobium or zirconium oxide.

8. The solar-control glazing unit according to claim 1, wherein the layer for absorbing solar radiation is formed of a material having an average extinction coefficient between 380 nm to 750 nm, of higher than 1.2.

9. The solar-control glazing unit according to claim 1, wherein the layer for absorbing solar radiation comprises a ZrCr alloy.

10. The solar-control glazing unit according to claim 1, wherein the layer for absorbing solar radiation has a geometric thickness of 3 nm to 40 nm.

11. The solar-control glazing unit according to claim 10, wherein the layer for absorbing solar radiation has a geometric thickness of 10 nm 25 nm.

12. The solar-control glazing unit according to claim 1, wherein the first and the second dielectric coatings flanking the layer for absorbing solar radiation are based on silicon nitride or aluminium nitride.

13. The solar-control glazing unit according to claim 1, exhibiting a color change in transmission $\Delta E^*_{tr}$ of smaller than 8 when said solar-control glazing unit is subjected to a temperature of at least 630° C. and at most 670° C. for 7 minutes.

14. The solar-control glazing unit according to claim 1, exhibiting a color change in reflection on the substrate-facing side $\Delta E^*_{rg}$ of smaller than 8 when said solar-control glazing unit is subjected to a temperature of at least 630° C. and at most 670° C. for 7 minutes.

15. The solar-control glazing unit according to claim 1, wherein the virtual thickness L of the first dielectric coating has a thickness of between 10 nm and 20 nm.

16. The solar control glazing according to claim 1, wherein the first and second dielectric coatings each comprise SiN.

17. The solar control coating according to claim 16, wherein the second dielectric coating further comprises a mixed oxide of $TiO_2$ and $ZrO_2$.

18. The solar control coating according to claim 16, wherein the second dielectric coating further comprises a mixed oxide of 50% $TiO_2$ and 50% $ZrO_2$.

19. A glazed element comprising the solar-control glazing unit according to claim 1, wherein the glazed element is a glazed element in an automotive vehicle, an architectural glazing element or as a glazed element in a household appliance.

20. A transparent solar-control coated substrate consisting of:
   a glazing substrate, and
   a transparent multilayer stack, the transparent multilayer stack consisting of in sequence starting from the glazing substrate:
   a first dielectric coating having a virtual optical thickness L of no more than 25 nm;
   a layer for absorbing solar radiation of between 3 nm and 40 nm in geometric thickness;
   a second dielectric coating having a virtual optical thickness L of between 40 nm and 85 nm; and
   optionally an outermost protective layer,
   wherein:
   the glazing substrate comprises a substrate side and a stack side;
   the layer for absorbing solar radiation comprises an alloy selected from the group consisting of NiCrW and ZrCr;
   the light reflection of the glazing substrate coated with the transparent multilayer stack as measured on the substrate side is at least 20% and is at least double the light reflection of the glazing substrate coated with the transparent multilayer stack as measured on the stack side;
   the color in reflection on the substrate side has an a* color coordinate value lower than 2 and a b* color coordinate value lower than 5, and
   L is defined as the sum of the (physical) geometric thicknesses, in nm, of each of the dielectric materials forming a dielectric coating multiplied by the refractive index n at 550 nm of each of the materials minus the refractive index of the gas of the surrounding atmosphere.

21. The solar-control glazing unit according to claim 20, wherein the layer for absorbing solar radiation comprises NiCrW alloy.

22. The solar-control glazing unit according to claim 20, wherein after a heat treatment between 630 and 670° C. for 7 minutes, the glazing unit exhibits a color change in reflection on the substrate-facing side $\Delta E^*_{rg}$ less than 3.

23. The solar-control glazing unit according to claim 20, wherein the light reflection of the glazing substrate coated with the transparent multilayer stack as measured on the substrate side is at least 2.5 times higher than the light reflection of the glazing substrate coated with the transparent multilayer stack as measured on the stack side.

* * * * *